No. 774,666. PATENTED NOV. 8, 1904.
E. P. HOLLIS.
COMBINED STALK CUTTER, ROOT EXTRACTOR, AND FERTILIZER DISTRIBUTER.
APPLICATION FILED NOV. 12, 1903.
NO MODEL. 2 SHEETS—SHEET 1.

Elijah P. Hollis, Inventor

No. 774,666. PATENTED NOV. 8, 1904.
E. P. HOLLIS.
COMBINED STALK CUTTER, ROOT EXTRACTOR, AND FERTILIZER DISTRIBUTER.
APPLICATION FILED NOV. 12, 1903.
NO MODEL. 2 SHEETS—SHEET 2.
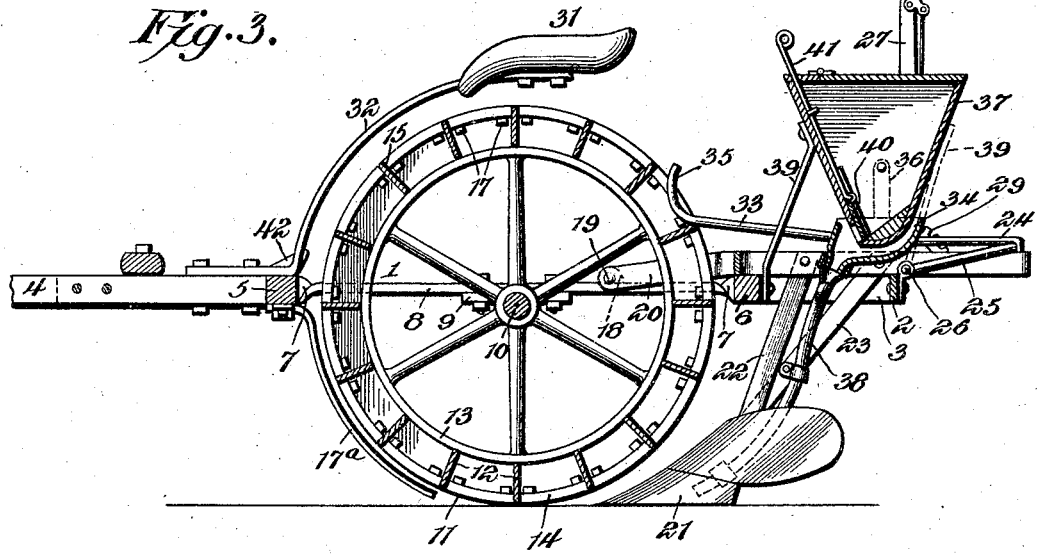
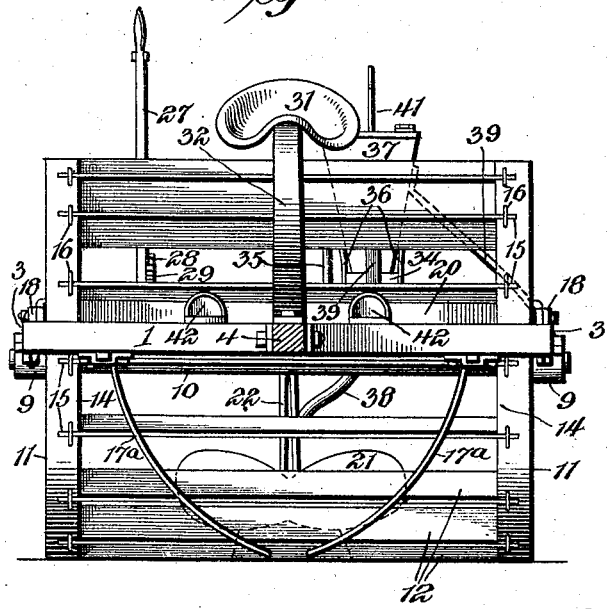
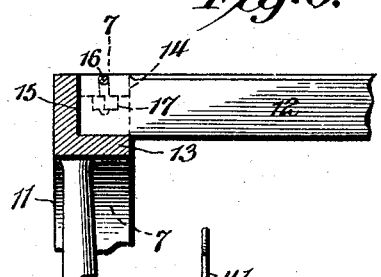
Elijah P. Hollis, Inventor,
Witnesses No. 774,666. Patented November 8, 1904.

UNITED STATES PATENT OFFICE.

ELIJAH P. HOLLIS, OF GREENVILLE, SOUTH CAROLINA.

COMBINED STALK-CUTTER, ROOT-EXTRACTOR, AND FERTILIZER-DISTRIBUTER.

SPECIFICATION forming part of Letters Patent No. 774,666, dated November 8, 1904.

Application filed November 12, 1903. Serial No. 180,906. (No model.)

*To all whom it may concern:*

Be it known that I, ELIJAH P. HOLLIS, a citizen of the United States, residing at Greenville, in the county of Greenville and State of South Carolina, have invented a new and useful Combined Stalk-Cutter, Root-Extractor, and Fertilizer-Distributer, of which the following is a specification.

The invention relates to a combined cotton-stalk cutter, root-extractor, and fertilizer-distributer.

The object of the present invention is to provide a simple and comparatively inexpensive machine designed for operating on the tall stalks of cotton-plants in the spring, for preparing the soil for the seed, and capable of crushing the stalks and of cutting the same into small pieces and of lifting the root from the ground and depositing fertilizer in the furrow.

A further object of the invention is to provide a machine of this character adapted to guide the stalks to the cutter and capable of effecting a positive feed of the fertilizer and adapted also to be readily thrown out of operation when it is desired to permit the machine to be conveniently turned at the end of a row and to be moved from one point of field to another.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 1:
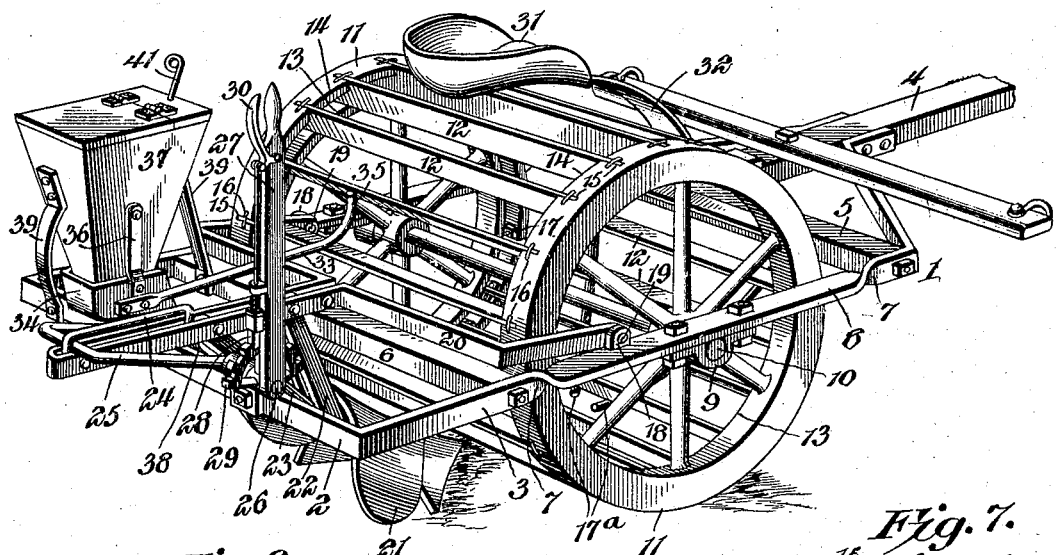
Figure 2:
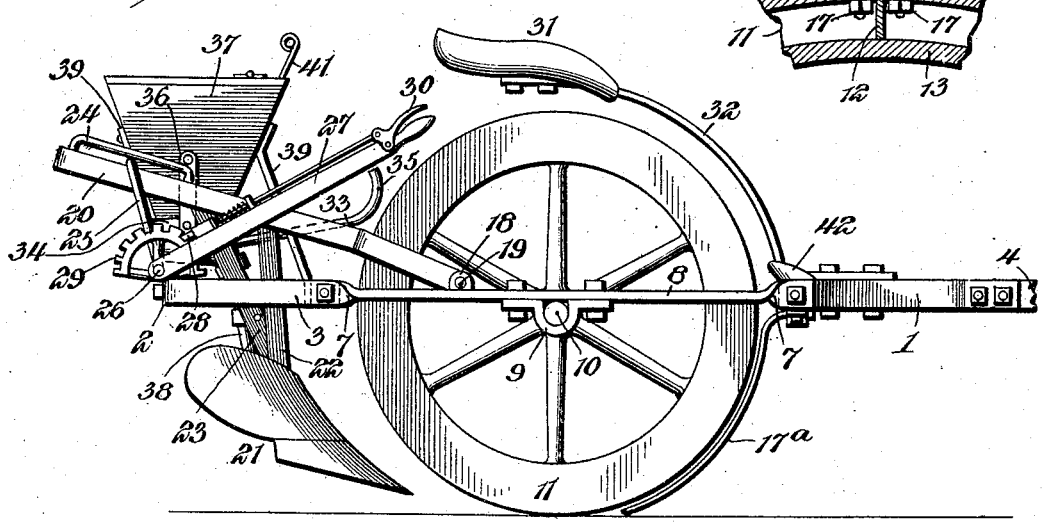
Figure 7:
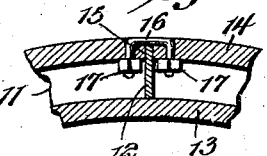

In the drawings, Figure 1 is a perspective view of a combined cotton-stalk cutter, root-extractor, and fertilizer-distributer constructed in accordance with this invention. Fig. 2 is a side elevation of the same, illustrating the arrangement of the parts when the machine is thrown out of operation. Fig. 3 is a longitudinal sectional view of the machine, the parts being arranged as shown in Fig. 1. Fig. 4 is a front elevation, partly in section. Fig. 5 is a detail sectional view illustrating the construction of the hopper. Fig. 6 is a detail view illustrating the manner of mounting the blades of the rotary stalk-chopper. Fig. 7 is a detail sectional view on line 7 7 of Fig. 6.

Like numerals of reference designate corresponding parts in all the figures of the drawings.

1 designates an approximately rectangular frame composed of a continuous bar or piece bent intermediate of its ends to form the rear end 2 of the frame and the sides 3 thereof, the front portions of the sides being bent inward and converged and secured to the draft beam or tongue 4 at opposite sides thereof, as clearly shown in Fig. 1 of the drawings. The sides of the frame are connected at the front by a transverse bar 5, which is also secured to the rear end of the draft beam or tongue; but the main frame of the machine may be constructed in any other desired manner, as will be readily understood. The side bars are also connected in rear of the center by a transverse bar 6, suitably secured to the side bars.

The side bars are provided between their ends with quarter turns or bends 7 to provide intermediate flat portions 8, to the lower faces of which are secured journal boxes or bearings 9 for the reception of a transverse shaft or axle 10. Mounted upon this axle is a rotary cutter which is adapted to crush down the stalks and cut the same into small pieces. This rotary cutter consists of open ends or heads 11 and connecting-blades 12, which may be provided with sharp edges or may be constructed of material sufficiently thin to cut the stalks without sharpening their edges. Each head or end consists, essentially, of a wheel and is provided with a central hub, radial spokes, and a rim having inner and outer inwardly-extending peripheral flanges 13 and 14. The inner peripheral flange 13 forms a seat or support for the blades 12, and the inner longitudinal edges thereof fit against the said flange 13. The outer flange 14 is provided at intervals with kerfs or slots 15 to receive the blades, and the latter are secured therein by means of clips 16, straddling or spanning the ends of the blades and having their sides or legs arranged in perforations of the outer flange 14. The ends of the sides or legs of the clips are threaded for the reception of nuts 17; but any other suitable means for securing the clips to the outer flange may be employed. The outer transverse portions of the clips are preferably countersunk in the flange 14, as shown. The blades, which are detachably secured to the circular ends or heads of the rotary cutter, may be readily removed when desired, and they may be arranged at any desired interval to cut the stalks into pieces of the desired length. When the machine moves forward, the rotary crusher or cutter is rotated, and the weight of the machine is sufficient to cause the blades to positively cut the stalks.

In order to cause the stalks of a row to pass beneath the center of the rotary cutter, a pair of inclined rearwardly-converging guides 17$^a$ is employed. These guides, which are clearly shown in Figs. 2 and 4, consist of rods or bars secured at their upper ends to the front transverse bar 5, and they extend downward and rearward therefrom, their rear terminals being spaced apart to provide a passage for the stalks. These guides cause the stalks to lie longitudinally of the row in position to be operated on by the rotary crusher and cutter, and they prevent the stalks from dropping or falling to either side of the row out of the path of the machine.

The side bars of the main frame of the machine are provided in rear of the shaft or axle with upper projecting ears or flanges 18, which are perforated for the reception of pivots 19 for securing an oscillatory approximately Y-shaped frame 20 to the main frame. The Y-shaped frame 20, which is preferably constructed of a single bar or piece of material, is provided with a forked or substantially U-shaped front portion. It has a rearwardly-extending central deposit-shank. The sides of the front portion of the pivoted frame are located at opposite sides of the rotary crusher and cutter, and they are pivoted eccentrically thereof for a purpose hereinafter explained. The pivoted frame, which is adapted to rest upon the rear portion of the main frame of the machine, carries a double-shovel plow 21, which is connected with the shank of the pivoted frame by bars or standards 22 and 23. The plow may be of any desired construction and configuration, and it is adapted to follow the rotary crusher and cutter, and it is capable of lifting the roots of the cotton-stalks out of the ground, and in practice the plow will penetrate the soil a sufficient distance for this purpose. The upper ends of the standards 22 and 23 of the plow are secured between the sides of the shank of the pivoted frame, the metal of the pivoted frame being centrally bent to form the said shank and being bent outward at the front end of the shank, as shown, to form the front portion of the pivoted frame.

The shank of the pivoted frame is provided at its rear portion with a longitudinal guide or loop 24, consisting of a rod or piece extending longitudinally of the rear portion of the shank of the pivoted frame and spaced from the upper edges thereof and having its terminals bent downward and secured between the sides of the shank. The guide or loop receives a crank bend or loop 25 of a crank or rock shaft 26, and the latter is journaled in suitable bearings of the rear end of the main end of the machine and is provided at one end with an arm or lever 27. The arm or handle 27 is located within convenient reach of the operator and is provided at its upper end with a grip, as clearly shown in Fig. 1 of the drawings. The rock or crank shaft is locked at the desired adjustment by means of a spring-actuated dog or pawl 28 and a toothed segment 29. The toothed segment 29 is mounted on the main frame of the machine and a latch-lever 30 is connected with the dog or pawl and is arranged adjacent of the grip or arm or handle 27 of the rock or crank shaft to enable the latter to be readily released when it is desired to adjust the pivoted frame. The machine is provided with a centrally-arranged seat 31 for the accommodation of the driver, and this seat, which is located directly above the rotary cutter or crusher, is supported by a curved standard 32, and the arm or lever 27 is arranged within convenient reach of the driver occupying the seat 31. When the rock or crank shaft is swung forward, the crank bend or loop is raised and the pivoted frame is swung upward to raise the plow above the ground, as illustrated in Fig. 2 of the drawings. This movement also disengages an arm 33 of a vibrating shoe 34 from the rotary cutter. The arm 33 consists of a rod extending longitudinally of the machine and secured at its rear end to the shoe 34 and having its front end 35 curved upward and adapted to be engaged by the blades of the rotary cutter, whereby the arm will be oscillated when the machine moves forward. The vibrating shoe is hung by opposite links 36 from the sides of a hopper 37, and it is adapted to feed fertilizer to a tube 38, which extends to a point in rear of the plow 21 and which is adapted to discharge fertilizer in a furrow after the roots have been lifted out of the ground. The tube, which may be of any desired construction, is preferably made of flexible material and is suitably secured to the plow and to the standard 23 thereof by means of clips or bends, as shown. The upper portion of the tube is attached to the shoe, but is adapted to vibrate with the same; but it may be constructed in any other desired manner to receive fertilizer from the shoe. The hopper is supported by suitable rods or bars 39, mounted on the main frame of the machine and extending upward therefrom, as shown, and the said hopper is located at one side of the shank of the pivoted frame. The feed of the material from the hopper is controlled by a suitable slide 40, mounted in suitable ways on the inner face of the front wall of the hopper and connected with a rod 41. The rod 41, which extends through the top of the hopper, is adapted to be readily grasped by the driver, and any suitable means may be provided for securing the slide at the desired adjustment.

The front of the main frame of the machine is provided at opposite sides of the center with suitable sockets 42 for the reception of the heels of the driver to prevent his legs from coming in contact with the blades of the rotary cutter.

It will be seen that the machine is simple and comparatively inexpensive in construction, that it is capable of crushing down the stalks and of cutting the same into small pieces, and that it is also adapted to lift out the roots and deposit fertilizer in the furrow. Also it will be clear that means are provided for guiding the stalks to the machine to prevent the same from falling to either side of a row out of the path of the machine and that the plow and the fertilizer-distributer may be readily thrown out of operation when it is desired to turn the machine at the end of a row or to transfer the machine from one field or place to another.

Having thus fully described my invention, what I claim as new, and desire to secure by Letters Patent, is—

1. In a machine of the class described, the combination of a cutter provided with blades, a plow, means for raising and lowering the plow, and a fertilizer-distributer actuated directly by the blades of the cutter and thrown into and out of operation by the means for raising and lowering the plow, substantially as described.

2. In a machine of the class described, the combination of a stalk-cutter, a plow for lifting the roots out of the ground after the stalks have been cut, means for raising and lowering the plow, and means for depositing fertilizer in the furrow resulting from the removal of the roots, the latter means being directly actuated by the cutter and arranged in the path of and thrown into and out of operation by the means for raising and lowering the plow, substantially as described.

3. In a machine of the class described, the combination of a stalk-cutter, a plow arranged in rear of the cutter and capable of upward and downward movement, a fertilizer-distributer operated by the cutter, and means for raising the plow, said means being also arranged to throw the fertilizer-distributer out of operation, substantially as described.

4. In a machine of the class described, the combination of a stalk-cutter, a plow arranged to lift the roots from the ground, and capable of upward and downward movement, a fertilizer-distributer, mechanism arranged to be actuated by the cutter for operating the fertilizer-distributer, and means for lifting the plow, the said means being also arranged to throw the said mechanism out of operation, substantially as described.

5. In a machine of the class described, the combination of a rotary cutter provided at intervals with blades, and a fertilizer-distributer provided with operating mechanism arranged to be actuated directly by the blades of the rotary cutter, substantially as described.

6. In a machine of the class described, the combination of a rotary cutter provided at intervals with blades, a fertilizer-distributer provided with operating mechanism arranged to be engaged by the said blades, and means for raising the plow, said means being also arranged to move the operating mechanism out of the path of the blades, substantially as described.

7. In a machine of the class described, the combination of a rotary cutter provided at intervals with blades, and a fertilizer-distributer having a vibrating shoe provided with operating mechanism, arranged in the path of and operated by the blades of the rotary cutter, substantially as described.

8. In a machine of the class described, the combination of a rotary cutter provided at intervals with blades, a fertilizer-distributer provided with a vibrating feed member, and having operating mechanism embodying an arm arranged in the path of the blades and operated by the same, substantially as described.

9. In a machine of the class described, the combination of a rotary cutter provided at intervals with blades, a fertilizer-distributer provided with a vibrating shoe having an arm arranged in the path of and operated by the blades, and means for moving the arm out of the path of the blades to throw the fertilizer-distributer out of operation, substantially as described.

10. In a machine of the class described, the combination of a rotary cutter having blades, a movable frame provided with a plow for lifting the roots out of the ground, a fertilizer-distributer having operating mechanism arranged in the path of the blades of the cutter, and in the path of the movable frame, and means for actuating the movable frame to raise the plow, and to move the operating mechanism of the fertilizer-distributer out of the path of the blades, substantially as described.

11. In a machine of the class described, the combination of a rotary cutter provided at intervals with blades, a plow arranged in rear of the cutter for lifting the roots from the ground, and a fertilizer-distributer comprising a hopper, a vibrating shoe having an arm arranged in the path of the blades and operated by the same, and a tube extending from the shoe to a point in rear of the plow, substantially as described.

12. In a machine of the class described, the combination of a rotary cutter provided at intervals with blades, an eccentrically-pivoted frame having a plow for lifting the roots from the ground, a fertilizer-distributer having a vibrating shoe provided with operating means arranged in the path of the blades and in the path of the pivoted frame, and operating means connected with the pivoted frame for raising the plow, and for carrying the said operating mechanism out of the path of the blades, and provided with locking mechanism for securing it at the desired adjustment, substantially as described.

13. In a machine of the class described, the combination of a rotary cutter provided with blades, a main frame, pivotally connected with the cutter, a pivoted frame mounted eccentrically of the rotary cutter and carried by the main frame and provided with a plow, a fertilizer-distributer mounted on the main frame, and having a vibrating feed member provided with operating means arranged in the path of the blades, and also in the path of the pivoted frame, and means for raising and lowering the pivoted frame, and for holding the same, substantially as described.

14. In a machine of the class described, the combination of a main frame, a cutter, a fertilizer-distributer directly operated by the cutter, a rearwardly-extending pivoted frame mounted on the main frame and provided with a plow for lifting the roots from the soil, said pivoted frame being arranged to throw the fertilizer-distributer out of operation, and a crank-shaft provided with operating means, and having a crank member slidably connected with the pivoted frame for raising and lowering the same, substantially as described.

15. In a machine of the class described, the combination of a main frame, a cutter, a fertilizer-distributer directly operated by the cutter, a pivoted frame mounted on the main frame, and arranged to throw the fertilizer-distributer out of operation and composed of a forked front portion, and a rearwardly-extending shank, the latter being provided with a guide, a plow carried by the pivoted frame, and a shaft provided with an operating mechanism, and having a crank member operating in the guide, substantially as described.

In testimony that I claim the foregoing as my own I have hereto affixed my signature in the presence of two witnesses.

ELIJAH P. HOLLIS.

Witnesses:
  A. BLYTHE,
  E. M. BLYTHE.